United States Patent [19]
Hodlewsky

[11] Patent Number: 5,096,050
[45] Date of Patent: Mar. 17, 1992

[54] LOW BACKLINE PRESSURE CHAIN

[75] Inventor: Wasyly G. Hodlewsky, Greendale, Wis.

[73] Assignee: Rexnord Corporation, Milwaukee, Wis.

[21] Appl. No.: 452,290

[22] Filed: Dec. 18, 1989

Related U.S. Application Data

[60] Division of Ser. No. 689,885, Jan. 9, 1985, Pat. No. 4,909,380, which is a continuation of Ser. No. 350,842, Feb. 22, 1982, abandoned, which is a continuation-in-part of Ser. No. 269,749, Jun. 2, 1981, abandoned.

[51] Int. Cl.$^5$ .......................................... B65G 17/00
[52] U.S. Cl. ...................................... 198/779; 198/853; 193/35 R
[58] Field of Search .............. 198/779, 850, 851, 852, 198/853; 193/35 R, 35 F, 35 TE

[56] References Cited

U.S. PATENT DOCUMENTS

| | | | |
|---|---|---|---|
| 614,306 | 11/1898 | Mason | 198/779 |
| 1,377,450 | 5/1921 | Wipple | 198/850 X |
| 1,852,942 | 4/1932 | Streine | 198/779 |
| 2,494,302 | 1/1950 | Mason | 193/35 F |
| 2,829,762 | 4/1958 | Oswald | 198/779 |
| 2,911,091 | 11/1959 | Imse | 198/853 |
| 2,920,734 | 1/1960 | Heinrich | 193/35 F |
| 2,938,614 | 5/1960 | Hewitt, Jr. | 193/35 TE |
| 2,954,113 | 9/1960 | Hibbard et al. | 198/851 |
| 3,036,695 | 5/1962 | Thuerman | 198/853 |
| 3,197,020 | 7/1965 | Evans et al. | 198/633 |
| 3,262,550 | 7/1966 | Kampfer | 198/852 |
| 3,279,586 | 10/1966 | Kampfer | 198/852 |
| 3,337,023 | 8/1967 | Kohl et al. | 198/787 |
| 3,503,490 | 3/1970 | Heyne | 198/779 |
| 3,512,627 | 5/1970 | Hodlewsky et al. | 198/852 X |
| 3,513,964 | 5/1970 | Imse | 198/852 |
| 3,520,398 | 7/1970 | Thomson | 198/852 |
| 3,543,917 | 12/1970 | Duerksen | 198/304 |
| 3,550,756 | 12/1970 | Kornylak | 198/637 |
| 3,568,822 | 3/1971 | Conkey et al. | 198/779 |
| 3,669,247 | 6/1972 | Pulver | 198/852 X |
| 3,672,488 | 6/1972 | Collins | 198/853 X |
| 3,776,349 | 12/1973 | Kampfer | 198/852 |
| 3,889,803 | 6/1975 | White | 198/833 |
| 3,910,404 | 10/1975 | Henrekson | 198/835 |
| 3,944,037 | 3/1976 | Stease | 193/35 F X |
| 3,951,255 | 4/1976 | Shuttleworth et al. | 198/790 |
| 4,053,039 | 10/1977 | Shuttleworth | 198/780 X |
| 4,067,428 | 1/1978 | Shuttleworth | 198/790 |
| 4,096,943 | 6/1987 | Gentsch | 198/793 |
| 4,231,469 | 11/1980 | Arscott | 198/779 |
| 4,271,960 | 6/1981 | Chalich | 198/779 |
| 4,436,200 | 3/1984 | Hodlewsky et al. | 198/851 |

FOREIGN PATENT DOCUMENTS

| | | | |
|---|---|---|---|
| 1070097 | 11/1959 | Fed. Rep. of Germany | 193/35 F |
| 1149665 | 5/1963 | Fed. Rep. of Germany | 193/35 F |
| 2210341 | 3/1971 | Fed. Rep. of Germany | |
| 2306973 | 8/1973 | Fed. Rep. of Germany | 198/852 |
| 42509A/80 | 12/1980 | Italy | |
| 7409883 | 8/1973 | Sweden | |
| 8101240 | 2/1981 | Sweden | |
| 917668 | 2/1963 | United Kingdom | 198/583 |
| 1041649 | 7/1966 | United Kingdom | 198/779 |

Primary Examiner—Robert P. Olszewski
Assistant Examiner—Cheryl L. Gastinau
Attorney, Agent, or Firm—Michael, Best & Friedrich

[57] ABSTRACT

A chain link for use in a low backline pressure chain. The chain link includes a base portion having top and bottom surfaces, first and second shaft support members extending upardly from the top surface of the base portion, at least one shaft extending between the first and second shaft support members, and a plurality of rollers mounted for rotation on the shaft. The chain link also includes a plurality of eye portions extending downwardly from the bottom surface of the base portion and adapted to receive a chain pin so as to permit the link to flex laterally when mounted in a chain.

9 Claims, 7 Drawing Sheets

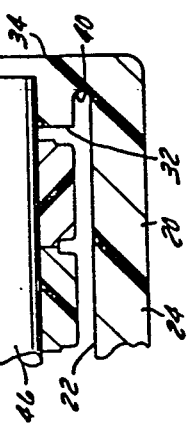
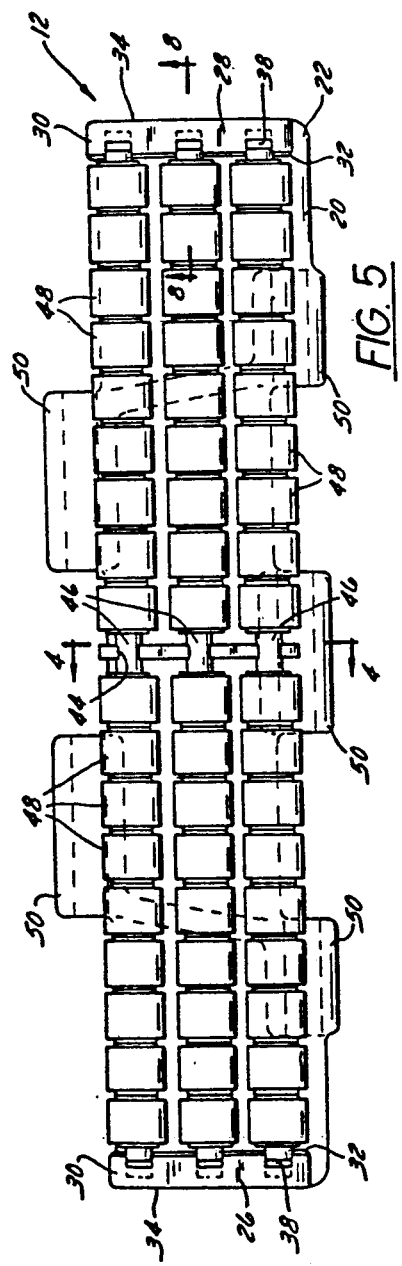
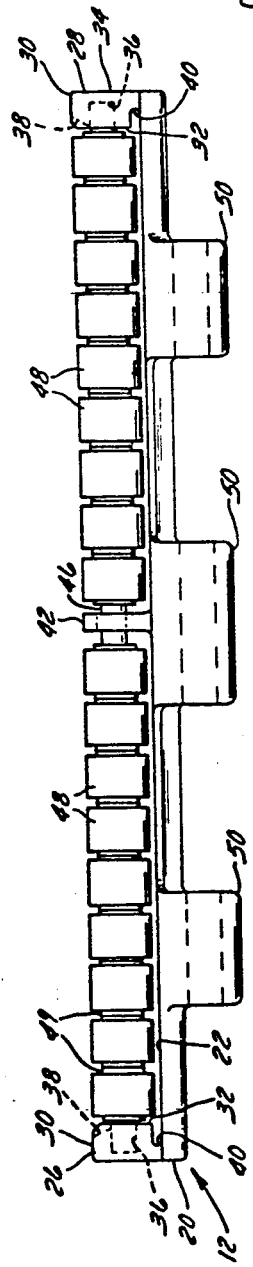
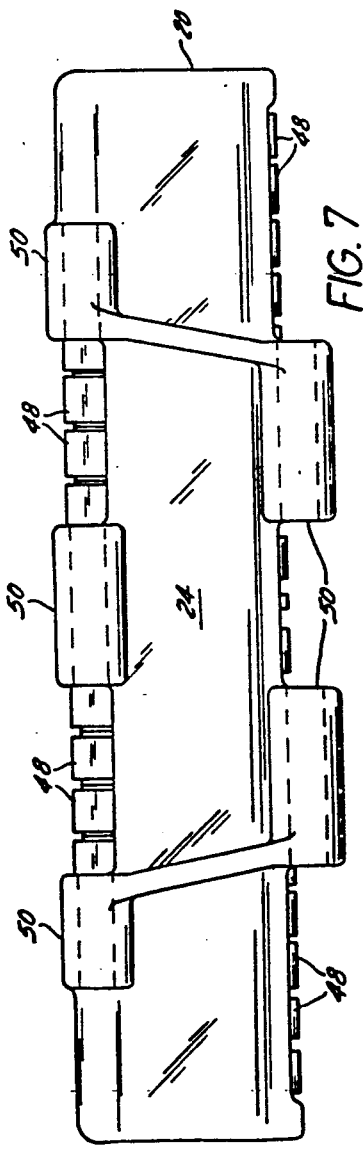

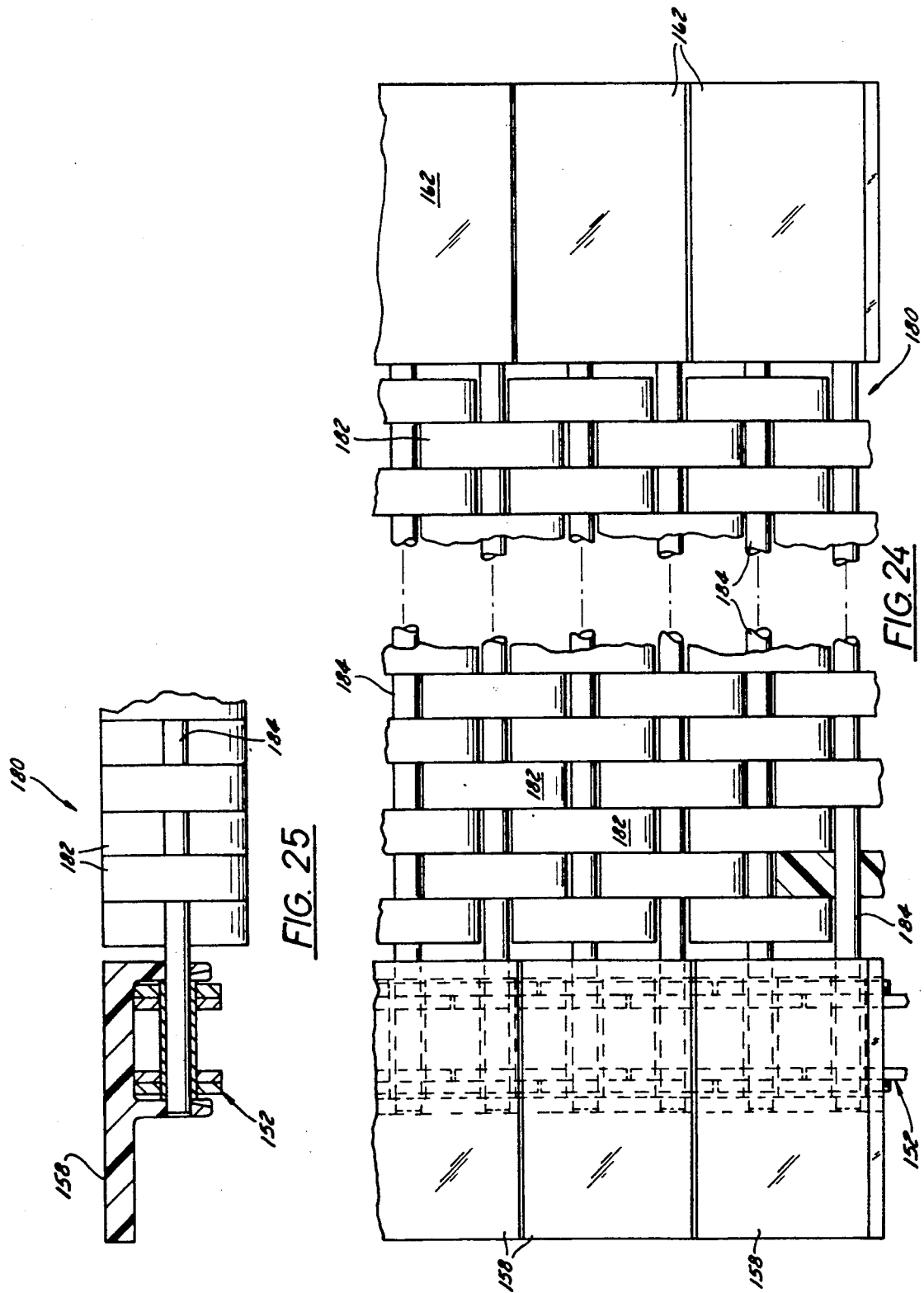

LOW BACKLINE PRESSURE CHAIN

BACKGROUND OF THE INVENTION

This is a division of co-pending application Ser. No. 689,885 filed Jan. 9, 1985, U.S. Pat. No. 4,909,380, which, in turn is a continuation of patent application Ser. No. 350,842 filed Feb. 22, 1982, now abandoned, which further in turn was a continuation-in-part of patent application Ser. No. 269,749 filed June 2, 1981, entitled "LOW BACKLINE PRESSURE CHAIN", now also abandoned.

This invention relates to chain links, and, more particularly, to chain links which can be used in a low backline pressure chain.

When transporting articles by means of a conveyor, there are many instances in which the articles will back up or accumulate on the conveyor. When articles accumulate, they push against each other, building up backline pressure. A large backline pressure is unacceptable when the articles being carried by the conveyor are fragile, because the force of the articles pushing against each other tends to damage them. The backline pressure also puts an extra load on the conveyor and sprockets and causes sliding friction and abrasion of the conveyor.

This problem has been dealt with in the past by mounting rollers in a conveyor frame and driving the rollers by means of a number of small belts such that the rollers slip relative to the shafts when backline pressure begins to build up. This is a relatively complicated system and involves considerable maintenance work in order to keep all the belts operating. Furthermore, this arrangement is not self-cleaning, and therefore the rollers would tend to jam if broken glass or other bits of material fall between the rollers.

Another method of handling backline pressure is by attaching sets of carriers to roller chains, such that each carrier has slots in its upper surface adapted to receive a shaft, and each shaft has a roller mounted on it.

SUMMARY OF THE INVENTION

The present invention seeks to solve the problem of backline pressure by providing shafts mounted in chain links, with a plurality of rollers mounted on each shaft. The plurality of short rollers on each shaft easily follow the bend of the shaft when it deflects due to the weight of articles on it so that the smaller rollers can continue to rotate freely without jamming. The short rollers are also easy to clean, so that, if dirt gets inside the short roller it can be easily washed out.

Some embodiments of the present invention provide polymeric link units which can be driven by a relatively wide-toothed sprocket, thereby distributing the driving force over a large area. One such embodiment provides a chain which is capable of flexing to the side so as to turn corners, thereby avoiding the limitation of having to run only in a straight line. Several embodiments provide polymeric link units which have a box-like construction which is designed to withstand higher loads before bending. They also include a novel means of attaching the shaft to the chain link, and, in some cases, provide an intermediate support for the shaft which permits the use of a smaller diameter shaft, thereby conserving material and reducing cost. The use of a smaller diameter shaft also permits a greater ratio of outer diameter to inner diameter on the rollers, making it easier for the rollers to slip over the shaft. The provision of two or more rows of rollers in each link unit provides for greater continuity of conveying surface between links and spreads the weight of the article over a large number of rollers so that the shaft-roller bearing pressure is low and the resultant wear rate is low.

The novel means for attaching the shaft to the polymeric link unit, as shown in several embodiments herein, includes integral support members at each end of the link, each support member having a receptacle in its inner surface and a ramp leading from its top surface to that receptacle. The shaft may thus be inserted by pushing it down the ramp, causing the support members to flex away from each other until the shaft snaps into the receptacle. The use of indented receptacles instead of bores extending completely through the support members creates a "blind eye" so that there are no problems with a straight shaft slipping out through an opening in the support member and also speeds and simplifies manufacturing for cost reduction and improved reliability of the assembly.

Other embodiments of the present invention provide novel means for attaching shafts with rollers onto a strand of chain made up of bushing links and hollow pin links. Another embodiment of the present invention provides a novel type of undriven conveyor, made up of a plurality of chain links fixed at least at one point to a conveyor frame. This undriven conveyor has several advantages over the prior art in that the chain can be easily replaced and the path of the conveyor can easily be changed simply by moving the chain to another position.

It should also be noted that, in several embodiments, the outside diameter of the rollers and the ratio of outside to inside diameter are in a range which is considered to be optimum for providing a relatively continuous conveying surface while still permitting the friction of the articles on the chain to easily turn the rollers.

BRIEF DESCRIPTION OF THE DRAWINGS

FIG. 5 is a top view of the link shown in FIG. 1.

FIG. 6 is a front view of the link shown in FIG. 1.

FIG. 7 is a bottom view of the link shown in FIG. 1.

FIG. 8 is an enlarged broken-away sectional view taken along section 8—8 of FIG. 5.

FIG. 24 is a top view of another embodiment of the present invention.

FIG. 25 is a broken-away front view partially in section of the chain shown in FIG. 24.

DESCRIPTION OF THE PREFERRED EMBODIMENTS

Figure 1:
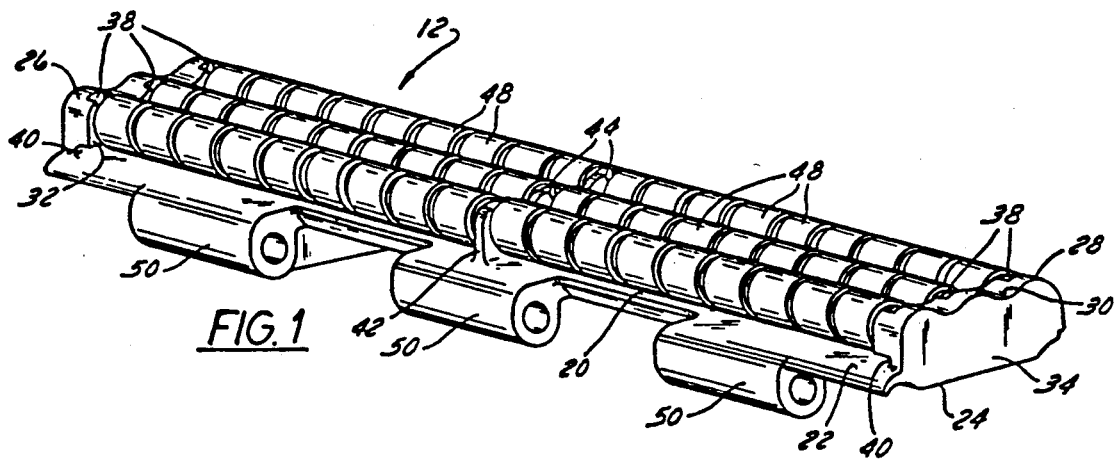
FIG. 1 is a perspective view of a link made in accordance with the present invention.

FIGS. 1 through 9 show various views and parts of a single embodiment of link 12. FIG. 1 is a perspective view of a link 12, which is made up of a flat base portion 20 having a top surface 22 and a bottom surface 24. The base portion 20 also includes edges running transversely to the direction of movement of the links 12 as they move with the chain 11. First and second shaft support members 26, 28 extend from and are integral with the top surface 22 of the flat base portion 20. Each shaft support member 26, 28, has a top surface 30; an inside surface 32, and an outside surface 34. The inside surface 32 has means for mounting a shaft, including an inwardly opening receptacle in the shape of a cylindrical indentation 36, which is shown in FIGS. 5, 6 and 8. In the embodiments shown here, each shaft support member 26, 28 has three cylindrical indentations 36 in its inside surface 32. The provision of three receptacles 36 in each shaft support member 26, 28 permits the mounting of three shafts in each link 12, thereby providing a more continuous conveying surface than would exist with only a single shaft in each link.

Figure 2:
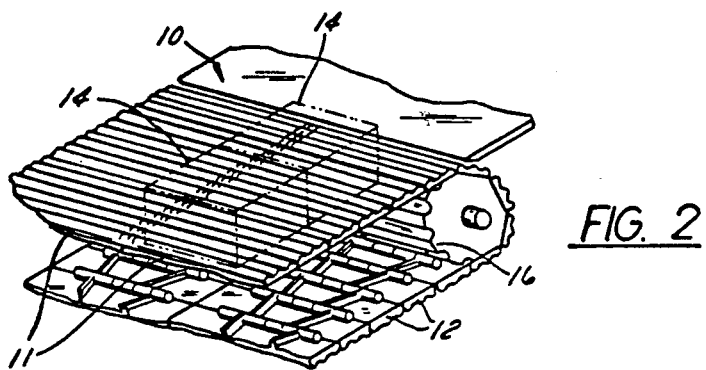
FIG. 2 is a schematic of a conveyor using two parallel chains made up of the links shown in FIG. 1.

Each shaft support member 26, 28 also has a ramp (or a resilient detent) 38 leading from its top surface 30 to each cylindrical indentation 36. The outside surface 34 of shaft support members 26, 28 is smooth, flush with the end of flat base portion 20, and has no perforations. This smooth, flush surface makes it possible for two chains made up of links 12 to run side-by-side, providing a wider conveyor, as shown in FIG. 2. A small perforation in the receptacle 36, which is smaller in diameter than the end of the shaft 46 would also be acceptable, because it would still form a "blind-eye" for retaining the shaft and would present a smooth outer surface, permitting two chains to run side-by-side.

Figure 9:
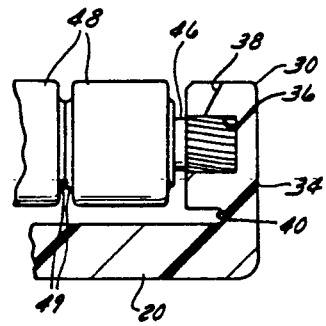
FIG. 9 is a broken-away sectional end view of the link shown in FIG. 1.
Figure 10:
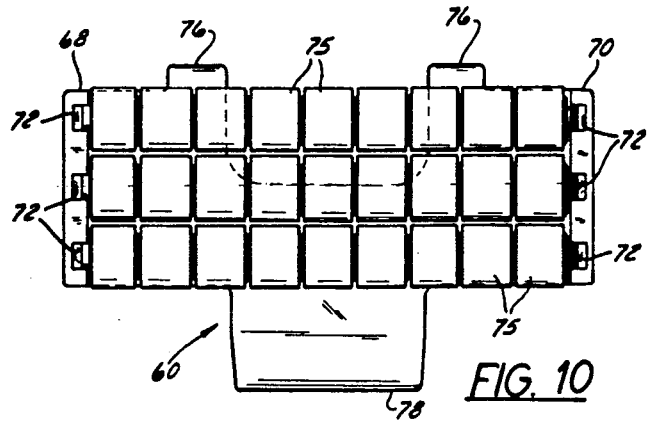
FIG. 10 is a top view of a side-flexing link made in accordance with the present invention.
Figure 12:
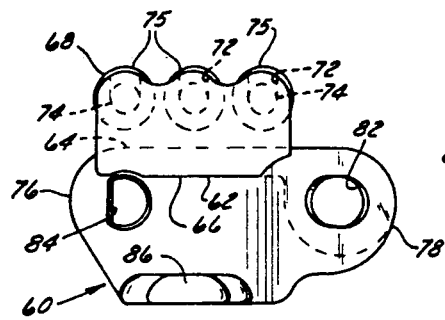
FIG. 12 is a side view of the link shown in FIG. 10.
Figure 11:
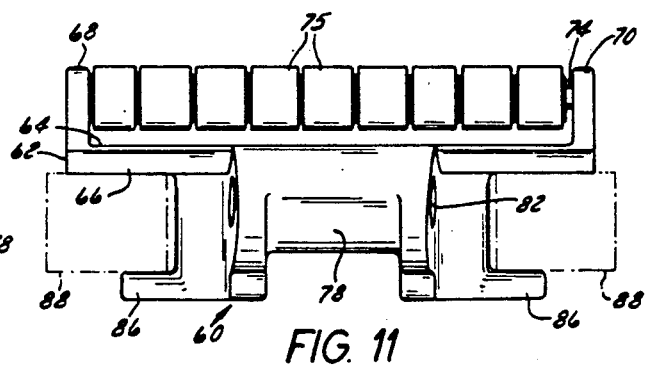
FIG. 11 is a front view of the link shown in FIG. 10, including support rails.
Figure 14:
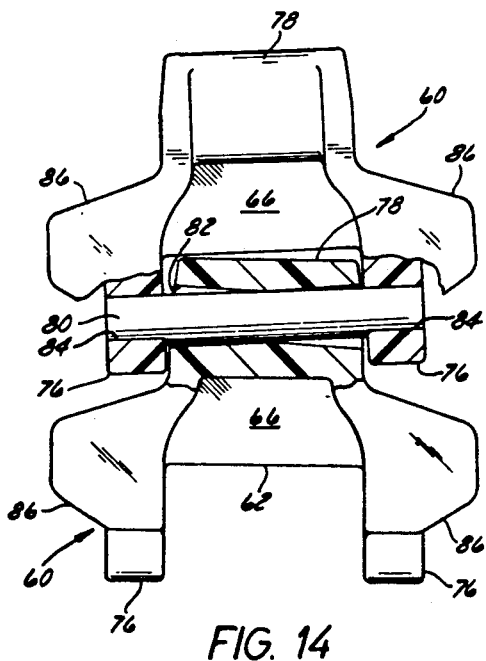
FIG. 14 is a broken-away bottom view partially in section of the chain of FIG. 13.
Figure 13:
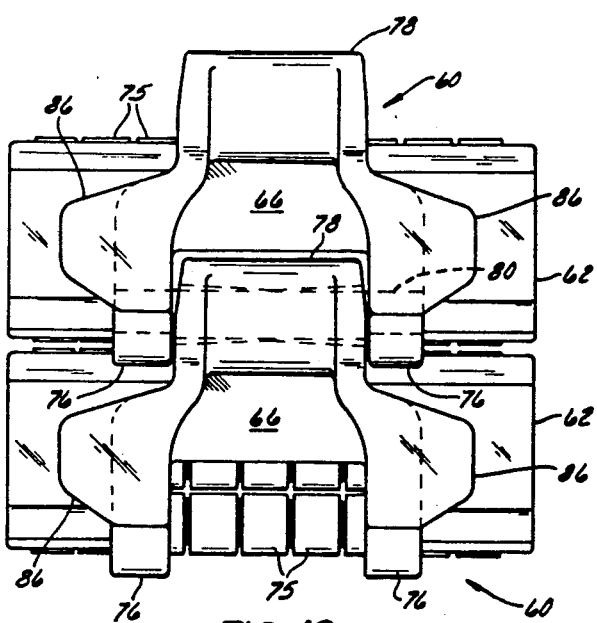
FIG. 13 is a bottom view of a chain made from two of the links shown in FIG. 10.

There is an undercut 40 in the inside surface 32 where the shaft support members 26, 28 meet the flat base portion 20. The undercut 40 can be seen most clearly in FIG. 8. An intermediate support 42 extends from the top surface 22 of the flat base portion 20 approximately midway between first and second shaft support members 26, 28. There are slot-like indentations 44 in the top surface of the intermediate support 42 adapted to receive and support a shaft. Shafts 46 are mounted in cylindrical indentations 36 in first and second shaft support members 26, 28 such that each shaft 46 has one end mounted in the first shaft support member 26 and the other end mounted in the second shaft support member 28. Each shaft 46 is also inserted into a slot-like indentation 44 for intermediate support. Of course, more than one intermediate support 42 could be used in a link 12. The existence of the intermediate support 42 means that shafts 46 can have a relatively small diameter and still support the same weight as would a larger diameter shaft without an intermediate support. It is preferable that the shafts 46 not rotate relative to the cylindrical indentations 36, so one or both ends of the shafts 46 may be knurled as shown in FIG. 9 so as to avoid such rotation.

A plurality of rollers 48 is mounted on each shaft 46. The inner diameter of the rollers 48 is slightly larger than the outer diameter of the shafts 46 so that the rollers 48 may rotate on the shafts 46. Rollers 48 have relatively short length, so that any bending or deflection of the shaft 46 will be less likely to cause freezing of the roller 48 on the shaft 46 than would be the case if the roller 48 were longer, and so that the rollers can easily be cleaned of any dirt which would tend to bind the roller on the shaft. The preferred length of the roller 48 is in the range of from approximately one-half to one times the outside diameter of the roller. If the roller is shorter, it becomes expensive to manufacture such a large number of rollers for each shaft and to assemble the rollers on the shaft, and, if the roller is longer, it becomes more difficult to clean and more likely to freeze on the shaft. It is desirable to make the rollers 48 with a small outer diameter in order to reduce the amount of discontinuity between rollers, so that small articles do not tip over on the chain. However, the ratio of the outer diameter of the roller to its inner diameter must also be large enough so that friction between the article being conveyed and the roller on which it sits will cause the roller to turn. It is thought that the optimum ratio of outer diameter to inner diameter of the roller is approximately in the range of 2.3 to 5. Also, the outside diameter of the roller which provides optimum continuity of conveying surface is approximately in the range of 0.4 to 0.6 inches.

The rollers 48 do not fit tightly against each other, but rather have a spacing which permits the rollers 48 to slide axially a short distance along the shaft 46 to aid in cleaning and to reduce the amount of friction exerted on a roller by adjacent rollers. Also, each roller 48 has a smaller diameter hub 49, so that, when the rollers 48 abut each other, they contact each other over a relatively small area and at a smaller distance from the centerline of the shaft. The benefit of the small area of contact and the short distance from the centerline of the shaft over which contact occurs is that there is little friction between a moving roller and a stationary roller, thereby allowing the rollers to move freely. The hub 49 shown here is molded as an integral part of the roller 48, but it is also possible to make the hub a separate member. The large number of short rollers and the low friction between the rollers are especially important if two articles are being carried on the same link 12. In that situation, the articles would be supported by different groups of rollers 48, and the movement of one article would not interfere with the movement of the other article, because of the separation of and low friction between the rollers.

The top surface 30 of the shaft support members 26, 28 has a sinusoidal type of curvature so as to conform to the shape of the rollers 48 so the articles being carried by the link 12 can be moved laterally across the link without catching on the shaft support members 26, 28. Likewise, the top surface of the intermediate support 42, with the exception of the slot-like indentations 44, conforms to the shape of the rollers 48 so that articles being carried by link 12 will not be caught on the intermediate support 42.

Looking now at FIG. 7 showing the bottom surface 24 of the flat base portion 20, it can be seen that there is a plurality of barrel or eye portions 50 extending from and integral with the bottom surface 24 of the flat base portion 20. The barrel portions 50 extend both downward from the surface 24 and in a direction parallel to the direction of movement of the chain 11. Each of the barrel portions 50 have walls defining holes passing through the barrel portions 50. The barrel portions and holes include coaxial axes running in a direction transverse to the direction of movement of the links 12 when they are moving as part of the chain 11. There are three barrel portions 50 on one side and two barrel portions 50 on the other side. In order to form a chain, the two barrel portions on one side of one link 12 fit into the spaces between the three barrel portions 50 on the adjacent link 12 with the axes of the barrels of the adjacent links in alignment. A pin 52 may then be inserted through all five barrel portions to couple the adjacent links together. Other known barrel arrangements, using different numbers of barrels, may be provided without departing from this invention.

Figure 3:
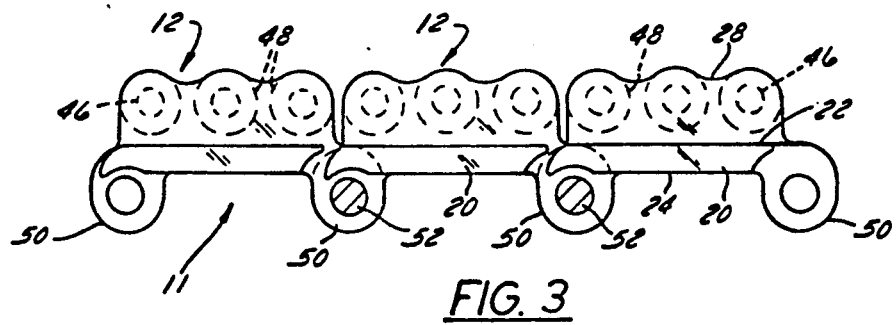
FIG. 3 is a side view of a chain made up of the links shown in FIG. 1.
Figure 4:
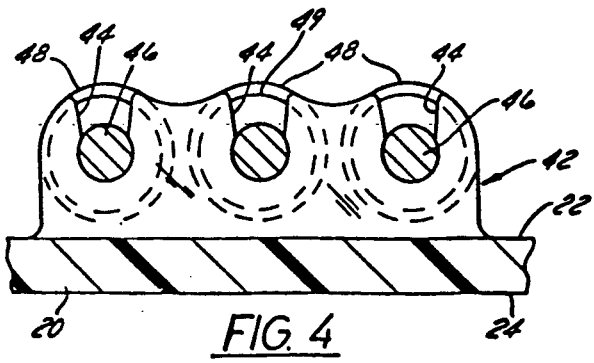
FIG. 4 is an enlarged broken-away sectional view taken along section 4—4 of FIG. 5, showing the intermediate support.

As is shown in FIG. 3, several of the shafts 46 on which the rollers 48 are mounted are positioned adjacent to and over the barrels 50. When adjacent ones of the links 12 are coupled together by chain pins 52, the rollers 48 on the shafts 46 adjacent the barrels are positioned above the barrels 50 of both of the coupled links 12. This permits the rollers 48 to be sufficiently close together, at the desired spacing, to provide the optimum continuity of conveying surface. This benefit is obtained at the coupling location of the links by positioning the shaft support members 26 and 28 on the base portion 20 such that shafts 46 bridge the barrels 50 of both adjacent coupled links. The rollers 48 thus overlie barrels 50 from both coupled links and provide a continuous conveying surface.

As shown in these figures, the flat base portion 20, barrel portions 50, first and second shaft support members 26, 28 and midpoint support 42 are all formed in a single polymeric piece. Shafts 46, as shown in these figures, are made of metal. Rollers 48 are polymeric. While these materials are preferred, other materials could also be used.

The chain 11 is driven by a sprocket 16 which engages the barrels 50 of the links 12, as shown in FIG. 2. This driving force is transmitted through the barrels 50 and chain pins 52 to all of the links 12 of the chain 11. Thus, the polymeric material of the walls of the barrels 50 must be of a sufficient thickness to withstand such driving force. One of the consequences of the relatively thick barrel walls is that they contribute substantially to the length of the links 12 and the base portions 20 of the links thus have a length corresponding to and determined in part by the thickness of the barrel walls. In turn, to provide a continuous conveyor support surface, the rollers 48 which overlie the top surface 22 of the base portion are increased either in diameter or in number in the direction of the length of the base portions 20 due to the significant thickness of the barrel walls.

In order to assemble the link 12, rollers 48 are first slipped over the shaft 46. Then the ends of the shaft 46 are placed on corresponding ramps 38 of first and second shaft support members 26, 28. Shafts 46 are pushed down the ramps 38, gradually separating first and second shaft support members 26, 28. The undercut 40 in the inside surface 32 of the shaft support members 26, 28 permits greater flexibility of the shaft support members 26, 28 relative to the flat base portion 20. It has been found from testing that, in many cases, the undercut 40 is not necessary, because most of the flexing, which permits the shaft support members 26, 28 to separate from each other, is flexing of the base portion 20. Shaft 46 slides down the ramp 38 until it reaches cylindrical indentations 36, at which point the first and second shaft support members 26, 28 snap back to their original position. The shaft 46 is thus captured by the shaft support members 26, 28.

Referring again to FIG. 2, a conveyor 10 is shown in comprising two chains 11 side-by-side, each chain 11 being made up of links 12. It is possible to use a single chain 11 or a number of such chains 11. Articles 14 are carried by the conveyor 10, and the conveyor 10 is driven by a sprocket 16 having relatively wide teeth. The bottom surface 24 of the flat base portion 20 may ride on support rails (not shown). When articles 14 begin to back up due to an obstruction or for some other reason, rollers 48 on the links 12 rotate relative to the links 12 thereby minimizing the amount of pressure exerted by one of the articles 14 against the other. The chain 11 also exhibits a self-cleaning feature in that debris such as broken glass, which was deposited on the links 12 while they were carrying articles 14, may fall from links 12 as they pass over the sprocket 16 and travel upside down on the return trip.

FIGS. 10 through 14 illustrate a link for a low backline pressure chain which is very similar to the link 12 but is capable of flexing laterally. Link 60 is made up of a flat base portion 62 which has top and bottom surfaces 64, 66, respectively. First and second shaft support members 68, 70 project from the top surface 64. Each shaft support member 68, 70 includes three shaft mounting means 72, which are the same as the cylindrical indentation and ramp in the previous embodiment. Other shaft mounting means, such as a simple aperture and a shaft with reduced ends, could be used instead of the mounting means 72 shown here, but the means shown here is preferred. Three shafts 74 are mounted on the link 60, the ends of the shafts 74 being mounted in the shaft mounting means 72 of the first and second support members 68, 70. One end of each shaft is knurled as described earlier. There is a plurality of rollers 75 mounted for rotation about each shaft 74.

A plurality of eye portions 76, 78 extends from the bottom surface 66 of the flat base portion 62, and the eye portions are dimensioned so that the central eye portion 78 of one link will fit between the outside eye portions 76 of the adjacent link, so that a pin can be inserted through the eye portions in order to fasten the links together. Looking at FIG. 14, it can be seen that the aperture 82 through the central eye portion 78 is enlarged so that two links 60 can laterally flex relative to each other by means of the pin 80 moving relative to the aperture 82. The aperture 82 may be oval in cross-section or may have a small diameter in the central portion and larger diameter toward the ends. It will also be noted that the apertures 84 in the outside eye portions 76 are roughly D-shaped, and the pin 80 has a corresponding D-shaped cross-section, so that the pin 80 does not turn in apertures 84. Projecting laterally from the lower part of the eye portions 76, 78 are tabs 86 which are adapted to fit under the support rails 88 shown in FIG. 11. The chain is held in place on the conveyor because the bottom surface 66 rides on top of the support rails 88 and tabs 86 ride under the support rails to prevent the chain from lifting up when going around corners.

Figure 15:
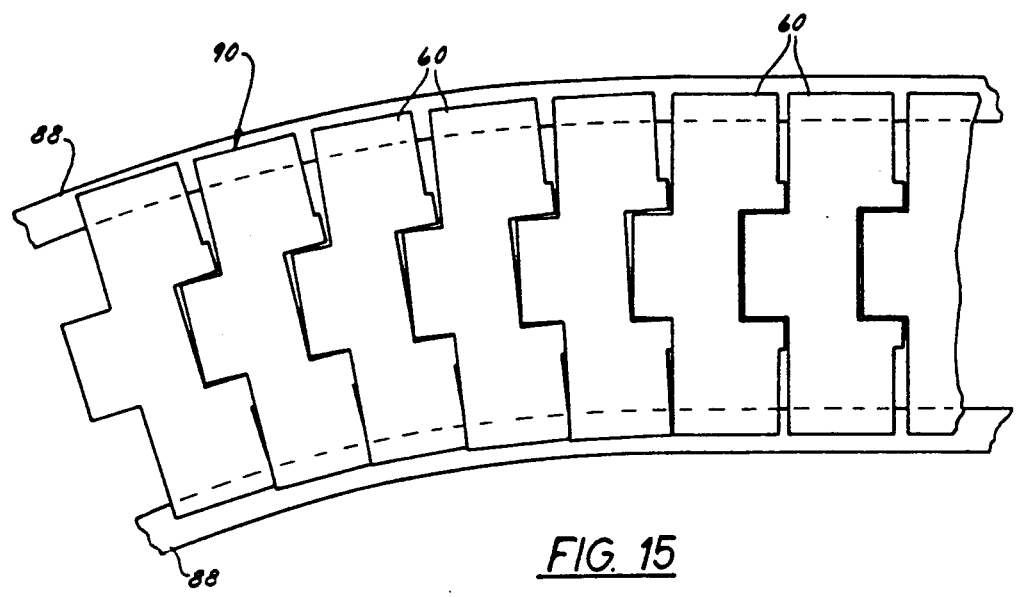
FIG. 15 is a schematic top view of the chain shown in FIG. 13 as it turns a corner.

FIG. 15 illustrates schematically the manner in which a chain 90, made up of links 60, is able to flex around a corner. An unexpected benefit of this chain 90 is that articles which are accumulating on the chain 90 tend to track the chain 90 even when going around a corner. Apparently, the fact that there is little resistance to movement of articles in the direction in which the rollers 75 rotate and that there is more resistance to lateral movement of articles across the rollers 75 tends to cause the articles to follow the curve of the chain. It may still be necessary to provide guide rails in some cases as a safety to prevent the articles from sliding off the chain when going around corners; however, there may also be instances in which the guide rails can be eliminated due to this tracking feature, and, even where guide rails are used, the contact between the products carried on the chain and the guide rails will be greatly reduced, thereby protecting the articles and any labels which may be on the articles.

Figure 16:
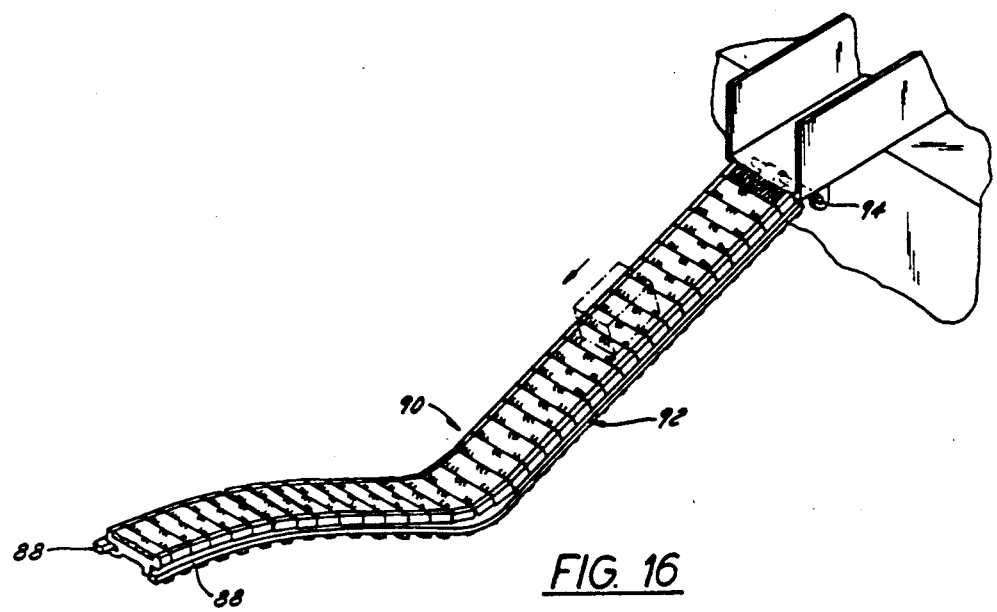
FIG. 16 is a schematic perspective view of a conveyor using the chain shown in FIG. 13.

FIG. 16 illustrates schematically the use of a chain 90 in an undriven conveyor 92. The conveyor is made up of a frame, comprising a pair of support rails 88, and a chain 90 which is fixed to the conveyor frame by means of a pin 94. A side-flexing low backline pressure chain 90 is shown in this instance, because the conveyor 92 conveys articles in a curving path, but, for straight paths, other chains as described herein could be used. A side-flexing chain 90 could be used in various configurations, other than that shown, such as a helical configuration. The use of a low backline pressure chain in an undriven conveyor has several advantages over the use of rollers mounted in the conveyor frame. First, the chain could easily be changed to accommodate different types of articles being carried, simply by removing the pin 94, removing the chain 90, and inserting another chain. Second, the path of the conveyor 90 could easily be moved so that the articles exit the conveyor 92 at a different point, simply by providing support rails (or some other support for the chain) in another direction and by moving the chain 90 onto those supports.

Figure 17:
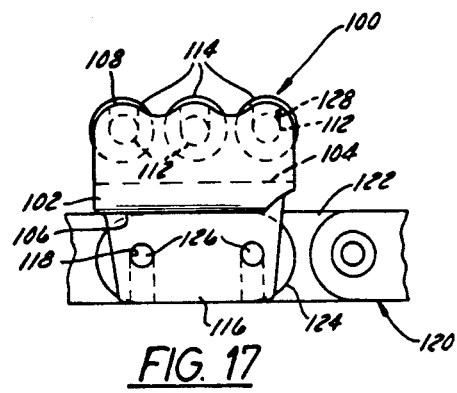
FIG. 17 is a side view of another embodiment of the present invention in which a polymeric flight including rollers is snapped onto a strand of chain.
Figure 18:
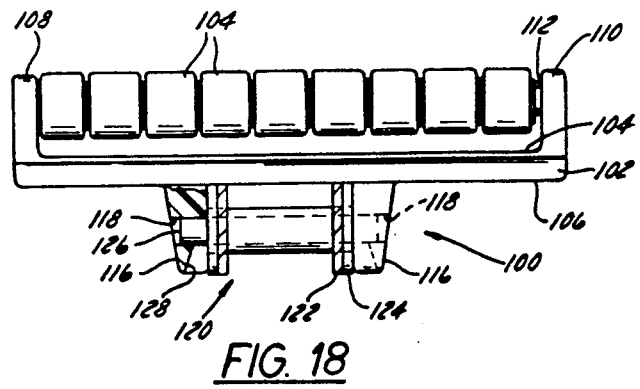
FIG. 18 is a front view of the chain shown in FIG. 17.

FIGS. 17 and 18 illustrate another embodiment of the invention, which is a chain 100. Like the previous two embodiments, the chain 100 includes a flat base portion 102 having top and bottom surfaces 104, 106, and having first and second shaft support members 108, 110 extending from the top surface 104 of the flat base portion 102. Each shaft support member 108, 110 includes a shaft mounting means like those shown previously. Shafts 112 extend between the first and second shaft support members 108, 110 and are mounted in the shaft mounting means. A plurality of rollers 114 is mounted for rotation on each shaft 112. Two legs 116 extend downward from the bottom surface 106, each leg having two eyes 118, such that the eyes 118 in one eye portion 116 are aligned with the eyes 118 in the other leg 116. If the chain were side-flexing, the legs 116 would include tabs as described with respect to FIG. 11. The legs 116 of the top plate are mounted on a strand of chain 120, which is made up of bushing links 122 and pin links 124, connected together by a plurality of chain pins 126. The strand of chain 120 may be either straight-running or side-flexing chain. The legs 116 are mounted over a pin link 124, and the pins 126 which extend through the pin links 124 extend into the eyes 118 so as to engage the eye portions 116.

Assembly of the chain is as follows:

First, the strand of chain 120 is assembled using pins 126. Then, the top plate is pressed downward onto the strand of chain 120 until the pin 126 contacts the ramp portions 128 on legs 116. Then, as the base portion 102 is pushed progressively downward, the pin 126 acting on the ramps 128 spreads the legs 116 apart until the pin 126 reaches the apertures 118, at which point the legs 116 snap back into position, fixing the base portion 102 on the strand of chain 120. Most of the bending which permits the legs 116 to separate takes place in the base portion 102. Then, the rollers 114 are mounted on the shafts 112, and the shafts 112 are inserted into the shaft support members 108, 110 as described in earlier embodiments. Once the shafts 112 are mounted in place, the assembly becomes more rigid, so that the base portion 102 is less able to flex to permit the legs 116 to separate. This increases the tendency of the base portion 102 to remain firmly mounted on the pin links 124.

Figure 19:
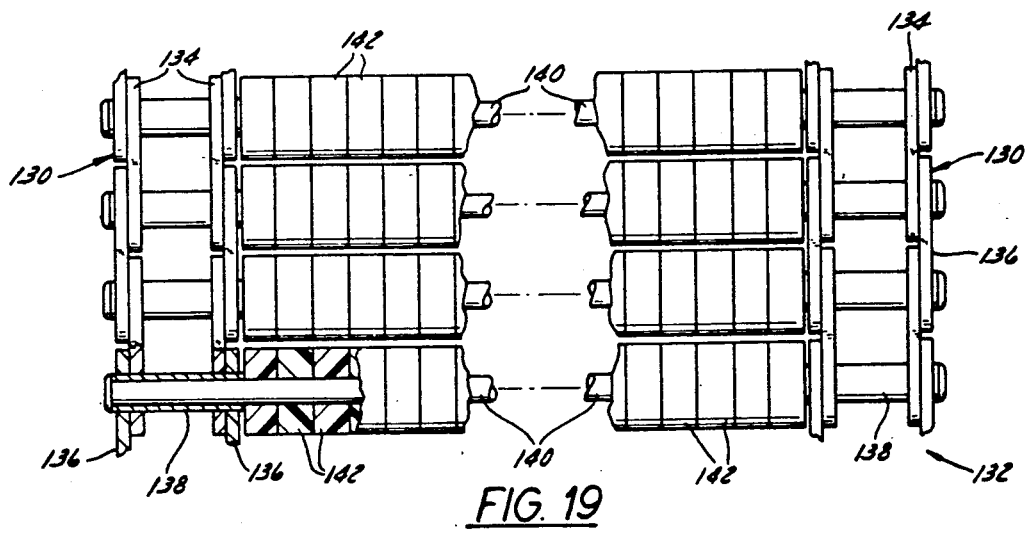
FIG. 19 is a top view of another embodiment of the present invention in which shafts with rollers are mounted in two strands of chain.
Figure 20:
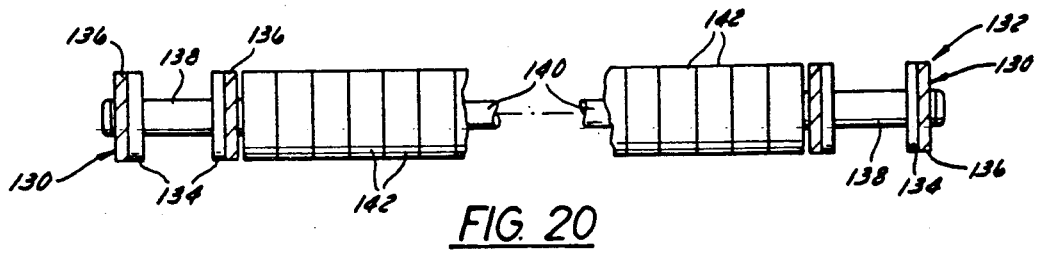
FIG. 20 is a front view of the chain shown in FIG. 19.

FIGS. 19 and 20 illustrate another embodiment of the invention in which two strands of chain 130 are interconnected to form a wide, low backline pressure chain 132. The bushing links 134 and pin links 136 are interconnected by means of hollow pins 138, which also serve as shaft mounting means. Shafts 140 have two ends, one end mounted through a hollow pin 138 in each strand of chain 130. The shafts 140 may be mounted in the hollow pins 138 by a press fit with the pins 138 or by upsetting the ends of the shafts 140 so as to stake them in place after insertion through the hollow pins. The width of the chain 132 may be varied to any width increment simply by using shafts 140 of different lengths.

A plurality of rollers 142 is loosely mounted for rotation about the shaft 140. In this embodiment, it is preferred that the strands of chain 130 are made of metal, while the rollers 142 are polymeric. This construction provides a compact low backline pressure chain which is capable of operating over long distances, due to the strength of the metallic chains 130.

Figure 21:
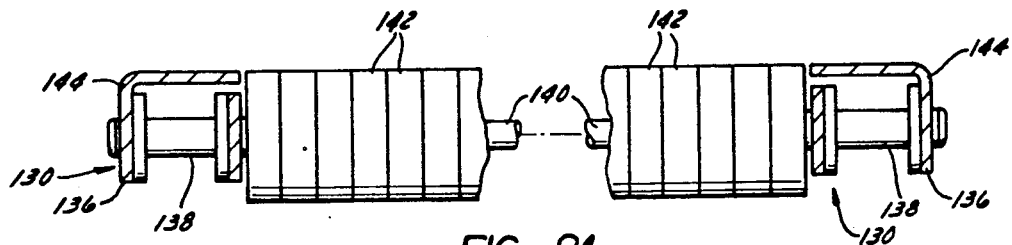
FIG. 21 is a front view of another embodiment of the present invention.

In FIG. 20 it can be seen that the height of the bushing links 134 and pin links 136 is made to conform to the height of the rollers 142 so that articles being carried by this chain 132 can be transferred across the chain without being caught on the strands 130. The height of links 134, 136 can be equal to or less than that of the rollers as long as the articles do not catch on the chain. If the height of the links 134, 136 is less than the height of the rollers, the conveyor may be built with a flat portion which fits over the chain 130 and is flush with the rollers 142 to aid in the transfer of articles across the chain 132. FIG. 21 is a modification of the embodiment shown in FIGS. 19 and 20 in which the outside plate 144 of each pin link 136 has an extension which projects inward over the strand 130. In this case, the height of the rollers 142 is matched to the height of the outer plate 144, thereby providing a smooth edge on the chain 132 so that articles can move laterally across the chain without catching on the strands 130.

Figure 22:
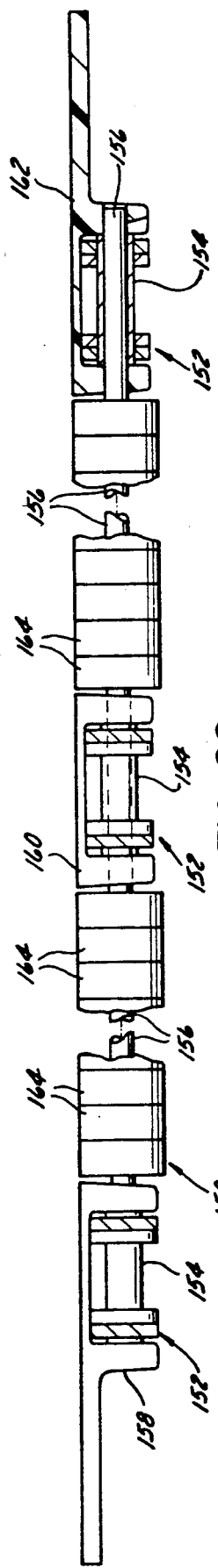
FIG. 22 is a front view of another embodiment of the present invention.
Figure 23:
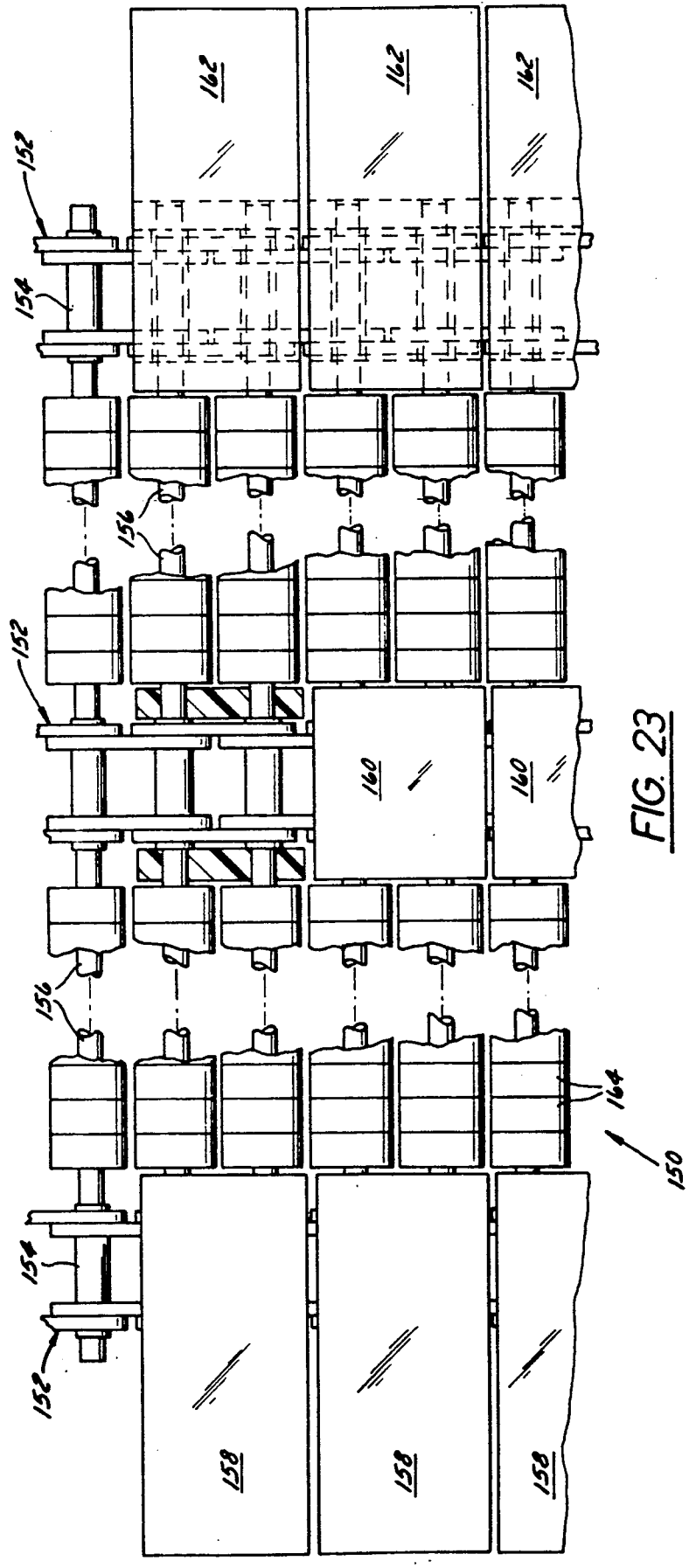
FIG. 23 is a top view of the chain shown in FIG. 22.

FIGS. 22 and 23 illustrate a chain 150, which includes three strands of straight chain 152, thereby providing a central support. The chain strands 152 are assembled with hollow pins 154, and shafts 156 are mounted in the hollow pins 154 as previously described. Prior to insertion of the shafts 156, attachments 158, 160, 162 are mounted over the hollow chain pins 154 as described earlier in reference to FIGS. 17 and 18. The top surfaces of the attachments 158, 160, 162 are flush with the top of the rollers 164, again so that articles can move laterally across the chain 150 without catching on anything.

FIGS. 24 and 25 illustrate a chain 180, which is similar to the chain shown in FIGS. 22 and 23, except that in this case the rollers 182 have a larger outer diameter and are installed so that the rollers 182 on one shaft 184 mesh with the rollers 182 on an adjacent shaft 184. In this case, the rollers 182 are spaced far enough apart that a roller 182 on one shaft 184 can fit between two rollers 182 on an adjacent shaft 184. This arrangement provides the possibility of a larger ratio of outer diameter to inside diameter of the rollers 182, thereby making it easy for the articles carried by the chain 180 to cause the rollers 182 to turn. However, at the same time, the conveying surface is less continuous, due to the gaps around the shafts. This chain 180 is probably best suited for carrying larger articles, in which case the discontinuities are small in relation to the size of the articles.

While several embodiments of the present invention have been described, it will be obvious to a person skilled in the art that various combinations and modifications could be made without departing from the scope of the present invention.

What is claimed is:

1. A chain link, comprising
a base portion having top and bottom surfaces and first and second ends with respect to a direction of movement;
means for connecting said link to a driving means whereby said link may be driven in said direction of movement;
first and second shaft support members integral with and extending upwardly from the top surface of said base portion and spaced apart transversely to said direction of movement at said first and second ends, respectively, each shaft support member having a plurality of inwardly opening receptacles in its inner surface, each of said receptacles being adapted to receive the end of a shaft; at least one of said shaft support members also having a resilient detent adapted to flex when said shaft is passed into one of said receptacles and then snap back and resiliently hold said shaft in said one receptacle;
a plurality of eye portions extending downwardly from the bottom surface of a said base portion and adapted to receive a chain pin, at least one of said eye portions being enlarged so as to permit said link to flex laterally when mounted in a chain;
a plurality of shafts extending between said first and second shaft support members such that one end of each shaft is carried in one of the receptacles in the first shaft support member and the other end of each shaft is carried in the corresponding receptacle in said second shaft support member; and
a plurality of rollers rotatably mounted on each of said shafts.

2. A chain link as recited in claim 1 and further comprising tabs projecting laterally from said eye portions so as to fit underneath conveyor guide rails to hold said conveyor link on a conveyor.

3. A chain link comprising
a base portion having top and bottom surfaces;
first and second shaft support members extending upwardly from the top surface of said base portion, each shaft support member including a shaft mounting means;
at least three spaced apart parallel shafts extending between said first and second shaft support members and supported by the shaft mounting means of the shaft support members;
at least three rollers mounted for rotation on each of said shafts such that said rollers provide a continuous conveying support surface above the top surface of the base portion.

4. A chain link comprising
a base portion having top and bottom surfaces;
first and second shaft support members extending upwardly from the top surface of said base portion, each shaft support member including a shaft mounting means;
at least three spaced apart parallel shafts extending between said first and second shaft support members and supported by the shaft mounting means of the shaft support members;
at least three rollers mounted for rotation on each of said shafts such that said rollers provide a continuous conveying support surface above the top surface of the base portion; and
a plurality of eye portions extending downwardly from the bottom surface of said base portion and adapted to receive a chain pin to interconnect adjacent links, at least one of said eye portions having a central bore adapted to house the chain pin such that said link is permitted to flex laterally when mounted in a chain.

5. A chain link as set forth in claim 4, wherein said base portion comprises the full width of said chain link, and includes opposite first and second ends, wherein said first and second shaft support members extend integrally from said first and second ends, respectively, and wherein each of the opposite ends of each of said shafts is supported in one of said first and second shaft support members so that each of said shafts spans the distance between said first and second shaft support members and defines thereabove a portion of the conveying surface.

6. A conveyor comprising
a conveyor frame including support means; and
a chain supported by said frame, said chain having a plurality of chain links, each chain link including a base portion having top and bottom surfaces; first and second shaft support members extending upwardly from the top surface of said base portion, each shaft support member including a shaft mounting means; at least three spaced apart parallel shafts extending between said first and second shaft support members and supported by the shaft mounting means of the shaft support members; at least three rollers mounted for rotation on each of said shafts such that said rollers provide a continuous conveying support surface; and a plurality of eye portions extending from the bottom surface of said base portion, at least one of said eye portions of each chain link being enlarged so as to permit said chain to flex laterally; and a plurality of chain pins attaching adjacent links together.

7. A conveying chain comprising
a plurality of chain links and chain pins coupling adjacent chain links, the chain links being movable in a direction and providing a conveying support surface, each chain link including
a base portion having top and bottom surfaces;
first and second shaft support members extending upwardly from the top surface of said base portion, each shaft support member including a shaft mounting means;

at least three spaced apart parallel shafts extending between said first and second shaft support members and supported by the shaft mounting means of the shaft support members;

at least three rollers mounted for rotation on each of said shafts, said rollers defining a uniform continuous conveying support surface for articles supported by the conveying chain; and a plurality of eye portions extending downwardly from the bottom surface of said base portion and adapted to receive a chain pin, at least a plurality of said rollers being positioned over said eye portions, at least one of said eye portions having a central bore adapted to house the chain pin, said central bore having opposite ends, the opposite ends having a diameter substantially larger than the chain pin so as to permit said link to flex laterally when mounted in a chain.

8. A conveying chain as set forth in claim 7, wherein said base portion of each of said chain link includes first and second transverse edges, and wherein each of said eye portions has a longitudinal axis, and defines a hole which is coaxial with said axis, and wherein the plurality of eye portions of each of said chain links includes at least two eye portions positioned coaxially adjacent the first edge of said base portion, and at least one eye portion adjacent the second edge of said base portion, said one eye portion being positioned between and in axial alignment with said two eye portions of an adjacent chain link for receiving a chain pin through the holes of the eye portions to couple each chain link to an adjacent chain link, and wherein at least one of said shafts is positioned adjacent the axially aligned eye portions of adjacent links, and the rollers on the shaft adjacent said aligned eye portions are positioned over the aligned eye portions of adjacent links to provide a continuous conveying support surface.

9. A conveyor comprising, a conveyor frame including support means; and a chain fixed to said frame and supported by said frame, said chain having a plurality of chain links, each chain link including a base portion having top and bottom surfaces; first and second shaft support members extending upwardly from the top surface of said base portion, each support member including a shaft mounting means; at least one shaft extending between said first and second shaft support members and supported by the shaft mounting means of the shaft support members; a plurality of rollers mounted for rotation on said shaft; and a plurality of eye portions extending from the bottom surface of the said base portion, at least one of said eye portions of each chain link being enlarged so as to permit said chain to flex laterally; and a plurality of chain pins attaching adjacent links together.

* * * * *